UNITED STATES PATENT OFFICE.

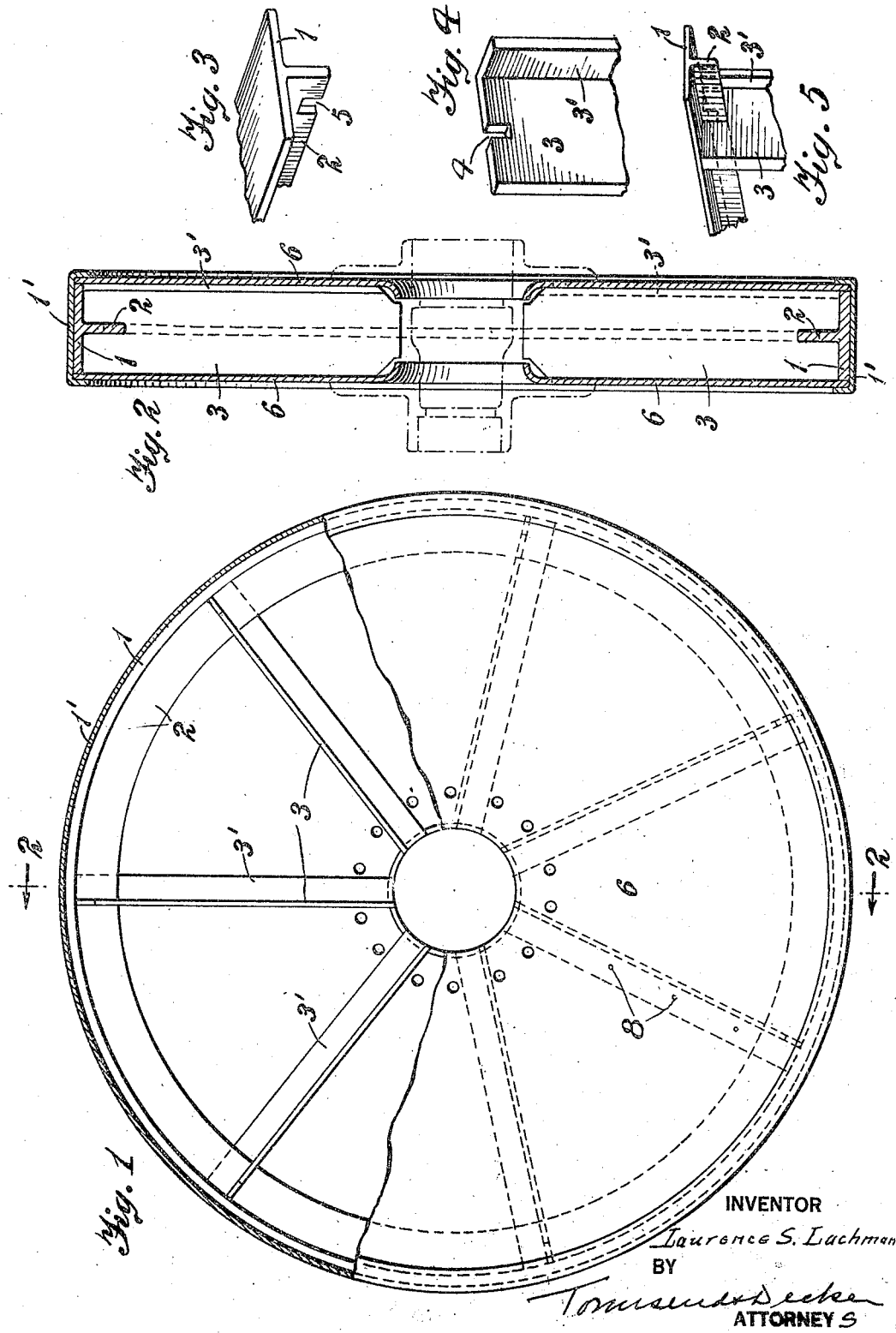

LAURENCE S. LACHMAN, OF NEW YORK, N. Y., ASSIGNOR, BY MESNE ASSIGNMENTS, TO BETHLEHEM STEEL COMPANY, OF BETHLEHEM, PENNSYLVANIA, A CORPORATION OF PENNSYLVANIA.

METAL WHEEL.

1,383,824.   Specification of Letters Patent.   Patented July 5, 1921.

Application filed June 3, 1919. Serial No. 301,459.

*To all whom it may concern:*

Be it known that I, LAURENCE S. LACHMAN, a citizen of the United States, and a resident of New York, in the county of New York and State of New York, have invented certain new and useful Improvements in Metal Wheels, of which the following is a specification.

My invention relates to the construction of metal wheels wherein the rim consists of a flanged metal bar and the spoke structure consists of metal bars secured to the flange of the rim.

The object of my invention is to produce a metal wheel of the above stated general character cheaply and expeditiously by the use of metal bars for the spokes and metal bars for the rim.

To these ends my invention consists essentially in a flanged metal rim having an internally projecting flange and metal spokes consisting of bar metal, the ends of said spokes being notched and interlocked with notches in the flanged rim to hold the spokes against both lateral and circumferential movement with respect to the rim.

The invention further consists in the combinations, parts and details of construction in a wheel wherein metal side plates are employed to inclose the rigid metal spoke structure or spider. This part of my invention relates more particularly to the manner of securing the metal side plates in place by the use of a supplemental plate embracing the circumference of the rim.

The invention further consists in the features of construction and combination of elements whereby a wheel of great strength is secured as hereinafter more particularly described and claimed.

In the accompanying drawings:

Figure 1 is a side elevation of a wheel embodying my invention, a part of one of the side plates employed being broken away.

Fig. 2 is a vertical section on the line 2—2 Fig. 1.

Fig. 3 is a perspective view or portion of a metal rim having its flanges notched and Fig. 4 is a perspective view of an end of one of the metal bars employed for the spoke and notched at its end for coöperation with the rim.

Fig. 5 illustrates in perspective the interlocking of the rim and spoke end.

1 indicates the metal rim consisting of a metal bar bent to the desired form of the circumference. Said bar is provided with an internally projecting flange or rib 2. The flanged bar shown has the flange or rib projecting intermediate of its edges and is in general form T shape in cross-section, the head of the T forming the outer circumference of the rim and the stem constituting the flange, this being the preferable form for carrying out my invention because of the symmetrical disposition of the flange or rib with respect to the edges and because the reinforcement afforded by the rib is central as respects the edges and gives the desired reinforcement in the simplest way.

I do not limit myself, however, to this particular form of flanged metal bar in cross-section, as other commercial forms of flanged metal bars may be used with the rim or felly of the wheel when bent to the circumference of the rim.

3 indicates the rigid metal spokes of a rigid spoke structure or spider. Each of these bars is also preferably, but not necessarily a flanged metal bar the flange of which is indicated at 3'. The metal bars constituting the spoke members seat at their inner ends upon the hub barrel or structure in any suitable manner but their outer ends are provided with notches indicated at 4. Notches indicated at 5 are also provided in the flange or rib of the rim member 1 so that when the spokes are assembled in proper relation to the rim and hub structure and as indicated in the perspective Fig. 5, the rim and spokes will be firmly interlocked and will be held against displacement with relation to one another both sidewise and circumferentially.

6 indicates metal side plates or disks inclosing the rigid spoke structure or member of the wheel and having a bearing at their extreme outer edges against the edges of the rim 1. They also, by preference, bear against the flanges 3' of the spokes. They are secured in position in any desired way either by bolts fastened through the structure from side to side or, if desired, by spot welding them to the flanges of the spokes at intervals, as indicated at 8. Their circumferential edges are held firmly against the edges of the rim in any desired way but preferably by an external plate 1', which embraces the circumference of the rim proper, and may act as an additional tread plate. The edges of this tread plate are spun over or turned down upon the edges of the side plates, thus securing the same firmly at their edge. The inner edges of the opening through said side plates or disks at the hub of the wheel may be turned inwardly as shown.

While I have illustrated spokes comprising flanged metal bars known commercially as angle bars, other forms of flanged metal bars might be used without departing from my invention, and, if desired, the flanges of said spoke bars might be omitted although it is preferable to retain them for strength and because they afford a good bearing for the side plates or disks.

What I claim as my invention is:—

1. In a metal wheel, a metal rim having an internally projecting continuous metal flange integral therewith and a rigid metal spoke member consisting of metal bars interlocked with the flange of the rim by notches on the ends of said spokes and flange as and for the purpose described.

2. In a metal wheel, the combination with a flanged metal bar bent to form a metal rim having an internally projecting flange provided with notches and metal spokes consisting of flanged metal bars notched at their ends for interlocking with notches in the flange of the rim.

3. In a metal wheel, the combination of a flanged bar bent to the form of the rim with the flange of the bar projecting inwardly, metal spokes consisting of flanged metal bars notched for interlocking with the flange of the rim against both lateral and circumferential movement and side plates or disks fastened to the flanges of the bars constituting the spokes.

4. In a metal wheel, the combination of a flanged metal bar bent to form the rim, a rigid frame constituting the spoke member of the wheel and comprising metal bars notched at their ends and interlocked with notches in the flange of the rim, metal side plates inclosing the spoke structure and means for securing them in place against the sides of said spoke structure.

5. In a metal wheel, the combination of a flanged metal rim, metal spokes comprising bars notched at their ends and interlocked with notches in the flange of the rim, metal side plates and an annular metal plate inclosing the rim and having its edge overturned to engage and hold the said side plates in place.

6. In a metal wheel, the combination of a metal rim having a centrally disposed internal circumferential rib integral therewith and spoke members comprising metal bars mechanically interlocked at their ends with the rib on the rim by notches in said rib and members whereby the said members are held against displacement both laterally and circumferentially.

7. In a metal wheel, the combination of a metal rim having a centrally disposed reinforcing rib integral therewith, metal spokes consisting of flanged metal bars interlocked with the rib or projection on the rim by notches in said rim and end of the spoke, and inclosing plates or disks secured in position against the flanges of the spokes.

8. In a metal wheel, the combination of a metal rim having an internal rib intermediate its edges, flanged metal spokes interlocked with said rib by notches in the rib and spoke ends, metal inclosing plates secured against the sides of the spokes and engaging the edges of the rim and an external metal plate seated upon the rim and having its edges overturned to secure the said plates in position.

Signed at New York in the county of New York and State of New York this 29th day of May A. D. 1919.

LAURENCE S. LACHMAN.

Witnesses:
F. B. TOWNSEND,
IRENE LEFKOWITZ.